(12) United States Patent
Freeman

(10) Patent No.: US 8,985,471 B2
(45) Date of Patent: *Mar. 24, 2015

(54) OPTICALLY READABLE IDENTIFICATION SECURITY TAG OR STAMP

(71) Applicant: James Freeman, Batavia, IL (US)

(72) Inventor: James Freeman, Batavia, IL (US)

( * ) Notice: Subject to any disclaimer, the term of this patent is extended or adjusted under 35 U.S.C. 154(b) by 12 days.

This patent is subject to a terminal disclaimer.

(21) Appl. No.: 13/923,855

(22) Filed: Jun. 21, 2013

(65) Prior Publication Data

US 2013/0306737 A1 Nov. 21, 2013

Related U.S. Application Data

(63) Continuation-in-part of application No. 13/271,441, filed on Oct. 12, 2011, now Pat. No. 8,469,282.

(51) Int. Cl.
| | | |
|---|---|---|
| *G06K 19/06* | (2006.01) | |
| *G03G 21/04* | (2006.01) | |
| *B42D 25/00* | (2014.01) | |
| *B42D 25/387* | (2014.01) | |

(52) U.S. Cl.
CPC ...... *G06K 19/06037* (2013.01); *G06K 19/0614* (2013.01); *G03G 21/043* (2013.01); *B42D 25/00* (2014.10); *B42D 2033/04* (2013.01); *B42D 2033/20* (2013.01); *B42D 2035/14* (2013.01); *B42D 25/387* (2013.01)
USPC ............ 235/494; 235/454; 235/470; 235/487

(58) Field of Classification Search
CPC .............. G06K 19/06037; G06K 2019/06225; G06K 7/10871; G06K 7/1417; G07C 5/3412
USPC ........... 235/454, 462.41, 487, 469, 470, 490, 235/494

See application file for complete search history.

(56) References Cited

U.S. PATENT DOCUMENTS

| | | | | |
|---|---|---|---|---|
| 4,389,063 | A * | 6/1983 | Ryan ......................... | 292/307 R |
| 6,584,214 | B1 * | 6/2003 | Pappu et al. .................. | 382/108 |
| 6,902,111 | B2 * | 6/2005 | Han et al. ...................... | 235/454 |
| 7,251,347 | B2 * | 7/2007 | Smith .......................... | 382/108 |
| 7,353,994 | B2 * | 4/2008 | Farrall et al. .................. | 235/454 |
| 7,380,128 | B2 * | 5/2008 | Bourrieres et al. ........... | 713/185 |
| 7,427,020 | B2 * | 9/2008 | Haraszti et al. ............... | 235/380 |
| 7,576,842 | B2 * | 8/2009 | Park ................................. | 356/71 |
| 7,831,042 | B2 * | 11/2010 | Stierman et al. ................ | 380/54 |
| 7,874,489 | B2 * | 1/2011 | Mercolino .................... | 235/491 |
| 7,995,196 | B1 * | 8/2011 | Fraser ............................. | 356/71 |
| 8,171,567 | B1 * | 5/2012 | Fraser et al. .................... | 726/32 |
| 8,196,807 | B2 * | 6/2012 | Grimard ....................... | 235/375 |

(Continued)

*Primary Examiner* — Paultep Savusdiphol
(74) *Attorney, Agent, or Firm* — Howard B. Rockman; Mercedes V. O'Connor

(57) ABSTRACT

The invention relates to a security tag made unique by randomly distributing a mixture of large numbers of multicolored small objects, such as two colored glass balls, into a regular geometric array or pattern onto a substrate and encapsulating those objects. The objects in the regular array on the substrate will create a unique, non-reproducible pattern. The data, saved to a secure database, can be processed and calculated quantities can be derived from the field of binary data, which can be affixed to the document or manufactured part that the stamp is affixed to. The regular array can be read out by scanner, quantities calculated, and compared to the values printed on the part or document. Additionally, the regular array can be read out by optical scanner and parts or all of the data compared to the data stored in the secure database.

12 Claims, 4 Drawing Sheets

(56) References Cited

U.S. PATENT DOCUMENTS

| | | | |
|---|---|---|---|
| 8,223,964 B2* | 7/2012 | Stierman et al. | 380/54 |
| 2003/0014647 A1* | 1/2003 | Bourrieres et al. | 713/185 |
| 2005/0038756 A1* | 2/2005 | Nagel | 705/76 |
| 2005/0075984 A1* | 4/2005 | Bourrieres et al. | 705/64 |
| 2006/0268259 A1* | 11/2006 | Park | 356/71 |
| 2007/0012784 A1* | 1/2007 | Mercolino | 235/491 |
| 2007/0023494 A1* | 2/2007 | Haraszti et al. | 235/12 |
| 2007/0152056 A1* | 7/2007 | Tuschel et al. | 235/454 |
| 2007/0170257 A1* | 7/2007 | Haraszti | 235/454 |
| 2007/0199991 A1* | 8/2007 | Haraszti et al. | 235/454 |
| 2007/0291988 A1* | 12/2007 | Karimov et al. | 382/103 |
| 2008/0142671 A1* | 6/2008 | Bourrieres et al. | 248/551 |
| 2008/0217931 A1* | 9/2008 | Bourrieres et al. | 292/307 A |
| 2008/0267511 A1* | 10/2008 | Bourrieres et al. | 382/209 |
| 2010/0128925 A1* | 5/2010 | Stierman et al. | 382/100 |
| 2010/0288840 A1* | 11/2010 | Perez | 235/454 |

* cited by examiner

Original

Photocopy

OPTICALLY READABLE IDENTIFICATION SECURITY TAG OR STAMP

This application claims priority to and is a continuation-in-part of non-provisional patent application Ser. No. 13/271,441 filed Oct. 12, 2011 to the extent allowed by law.

BACKGROUND OF THE INVENTION

1. Field of the Invention

The present invention is in the field of product or document marking or identification. In particular, this invention relates to unique product identification and protection against counterfeiting.

2. Description of the Prior Art

Counterfeit replacement spare parts and forgery of sensitive documents and paper currencies have been a severe and on-going problem for a long time. Whole sectors of the world economy, such as government defense sectors, are overrun by counterfeiters. The most affected sectors are the clothing, fashion, music, movie and software industries, which is flooded with false CDs and DVDs. The victims are legitimate industries and consumers, predominantly in developed economies. The losses are in the hundreds of billions of dollars.

A Jul. 16, 2003 article in *The New York Times* by David Johnston on the subject of funding terrorism stated that " . . . The Federal Bureau of Investigation estimated in 2002 that the cost [of counterfeit goods] to American businesses was $200 billion to $250 billion a year." A Consumer Report article, available on the web site www.consumerreport.org on Dec. 21, 2008, stated that in 2006". . . Counterfeit merchandise is estimated to cost legitimate businesses up to $250 billion in yearly sales." The 2008 numbers were probably close to $300 billion a year in the United States and more than 1 trillion worldwide.

Two Consumer Report articles, *Real or fake ?* and *Why fakes are booming*, available on the Internet, state that "In 2006, a record year for seizures, 14,000 shipments of counterfeit merchandise were confiscated. . . . Investigators have seized brake parts made of kitty litter, saw dust and dried grass . . . "

In another example, the Oct. 13, 2008 front cover of the *Business Week* article titled *Dangerous Fakes* centers on the danger posed by the flood of counterfeit electronic parts in sensitive military equipment. The opening sentences of the article read: "The American military faces a growing threat of potentially fatal equipment failure—and even foreign espionage—because of counterfeit computer components used in warplanes, ships and communication networks. Fake microchips flow into complex weapons. . . . but government documents . . . , suggest possible connections between phony parts and breakdowns."

Security tags and identifiers to help prevent counterfeiting are well known but have two principal flaws that limit their utility. Two-dimensional ("2-D") printed tags are susceptible to copying or printing and existing security tags having three-dimensional ("3-D") features suffer from the difficulty of verifying that the 3-D pattern is in fact the "right" pattern, the pattern which was originally created on the item when it was fabricated. Existing patents describe a number of ways to image the 3-D aspects of the tag to verify the pattern. These include microscopic imaging, using fluorescence, and other customized read-back mechanisms. Additionally, since the image is comprised of analog data, comparison to the expected pattern is difficult, requiring pattern-recognition software and computation.

The present invention avoids the above difficulties. The security tag of the present invention uses 3-D objects, making it virtually impossible to copy. The present invention places the objects in a regular array of objects, using objects of contrasting colors, different hardnesses, or different x-ray emission qualities, to create a standard 2-D barcode pattern. In one embodiment, the present invention uses contrasting colors such as black and white. The random occurrence of the colors of the objects in the regular grid locations create unique and practically impossible to duplicate tags. The regular array of 3-D objects is easily readable by standard barcode readers, and the data formed is immediately in binary data string format. This allows for straightforward comparison to the reference data string that was measured when the item was fabricated. As an example of the uniqueness of the tag made in this fashion, consider the format of data matrix bar codes which allow up to 144×144 binary bits. Black and white glass objects randomly filling the 144×144=20,736 sites would have more that $10^{6,600}$ possible variations.

The prior art indicates numerous attempts in the past to provide a specific apparatus and/or a method intended to distinguish legitimate products, components or documents from counterfeited ones. One such well known method is stamping, which may include indentations or printing, on parts, components or products with a set of characters, such as numbers, letters or a combination thereof. However, such prior efforts have not been overly successful. As a result, the efforts to contain commerce in counterfeit goods are presently conducted mostly on the enforcement, political and diplomatic levels.

The prior art includes a number of patents and a publication that attempt to address the issue of unique tags to serve for counterfeiting deterrence. Some of these are U.S. Pat. Nos. 7,126,755, 7,399,643, 7,580,845, 7,623,624, 7,659,983, 7,791,489, 7,872,804, and U.S. patent publication 2009/0194589. These inventions have no real relevance to the present invention.

U.S. patent publication 2009/0065583 discloses a retro-emissive marking system that returns a coded-spectrum optical signal when interrogated by an appropriate light beam. This application uses fluorescent objects that emit characteristic frequencies when excited by a (UV) interrogation beam. Measuring the ensemble of wavelengths present allows for identification of the object. This particular idea is very different from the present invention in that it does not use a two-dimensional grid of 3-D objects whose dark or light random occurrence generates a unique identification pattern.

U.S. patent publication 2009/0309733 discloses a layer with randomly distributed features such as particles or fibers. The particles can be physical particles, voids, magnetic particles, or variations in surface properties such as roughness or color. This concept uses the random nature of the location and type to generate the identification. The present invention is very different in that the randomly colored black or white objects, such as suitable balls, in a fixed regular grid create the unique identification. Random features such as location and shape of threads or flaws in a volume are very difficult to measure and encode into a computer, whereas the present invention of randomly colored 3-D objects on a regular grid is very easy to encode into a computer.

U.S. patent publication 2010/0253061 discloses an optically variable security device made from a photonic crystal material. Deformations applied to the crystal layer change the optical reflection. The pattern of reflected light is then used for identification. This idea differs from the present invention in several aspects. The identification comes from light reflected off of a layer, and hence is not three-dimensional.

Also the random defects formed into the layer do not form a "binary image" that can be easily machine readable.

The literary reference "Anti-counterfeiting Packaging Technologies" by RajvDhar was considered. It discloses "several methods of applying a pseudo-random image for each item in a batch, such as a pattern of lines or dots in one area of the carton, and then scanning the signature into the batch database via secure algorithms, for later authentication." This reference does not discuss the use of three-dimensional structures to make a unique stamp, the pattern of which forms the verification information.

The literary reference "Counterfeit deterrent features for the next-generation currency design" by the National Research Council (U.S.), Committee on Next-Generation Currency Design, page 74, discusses embedding random patterns into currency, such as by mixing optical fibers into the slurry to form paper for bank notes. Custom photo-detectors would read out and encrypt the random pattern. This idea is substantially different from the present invention in that the random pattern formed is not "binary" and would not serve to easily identify the bank note. Custom readers or scanners would be required, while in the present invention, standard 2-D barcode scanners could be used. Furthermore, the present invention is extremely robust against partial damage because the pattern is so unique and is suitable for application after fabrication, to paper and non-paper items.

The relevant prior art, taken alone or in combination, tends to teach away from the present invention in that the references do not consider reading the pattern formed by a random array of three-dimensional beads forming the identification stamps. None of the prior art can be combined to suggest this modification. None of the prior art can be combined in this way to suggest these necessary modifications. There is no teaching, suggestion, or motivation that would have enabled a person of ordinary skill in the art to modify any prior art security or identification tags.

The primary object of the present invention is to provide an apparatus and a method for unique identification of manufactured parts, products and documents.

Another object of the present invention is to provide an apparatus and a method for unique identification of manufactured parts and documents that cannot be copied and that cannot be circumvented by any counterfeiter.

Yet another object of the present invention is to provide an apparatus and a method for unique identification of manufactured parts, products and documents that are robust and immune to damage or tampering.

Still another object of the present invention is to provide an apparatus and a method for unique identification of manufactured parts, products and documents that are capable of long-time archival identification of such manufactured parts, products or documents.

A further object of the present invention is to provide an apparatus and a method for unique identification of manufactured parts, products and documents that requires the use of existing, simple and well proven technologies to build, implement and use.

Yet a further object of the present invention is to provide an apparatus and a method for the unique identification of manufactured parts, products and documents that does not require expensive development of additional advanced technology or technologies.

Still a further object of the present invention is to provide an apparatus and a method for unique identification of manufactured parts, products and documents that are very inexpensive to manufacture, acquire and operate.

Still another object of the present invention is to provide advanced means for protecting paper or similar items such as passports and paper currencies, which may have important advantages in preventing a variety of illegal and undesirable activities globally.

Yet another object of the present invention is to provide advanced means for detecting tampering wherein by applying the security tag of the present invention as a security seal, tampering with it will damage the seal and cannot be duplicated and/or replaced.

Yet a further object of the present invention is to provide advanced means for marking machine parts permanently by using balls of different hardnesses, such as steel and plastic balls, wherein the security tag of the present invention can be pressed or stamped with a suitable tool into the surface of a machined metal part, permanently marking the part with a unique, random, computer-readable pattern.

These and other objects of the present invention will become apparent when reading the enclosed detailed description in view of the attached drawings.

SUMMARY OF THE INVENTION

The present invention provides for an apparatus and a method for permanent, high-tech and safe identification of certain classes of manufactured parts or products, such as particularly critical or expensive replacement or spare parts for all kinds of precision machinery and electronics devices, and various documents, such as passports, driver's licenses, credit cards or other critical identification documents.

In general, the design of a security tag or stamp of the present invention has several new and unique features. In particular, the present invention involves positioning in a predetermined pattern a large number of small 3-D information generating objects, such as suitable balls made in two colors, on a base substrate. The regular, predetermined pattern of such 3-D objects facilitates scanning while the random distribution of the colors of the balls or other differentiating properties of the balls within such predetermined pattern creates large amounts of unique information (thermodynamically an irreversible increase in entropy) that can be used to uniquely identify various parts or documents.

The base substrate can be any suitable rigid or flexible, preferably substantially flat, substrate or tray. Such substrate may comprise two sections wherein in one section 3-D objects may be positioned in a predetermined pattern and randomly distributed within such pattern, and wherein in the other section such 3-D objects may be randomly distributed only. To obtain the desired predetermined pattern, the first section may comprise suitable arrangements of suitable dimples or indentations as receptors for the positioning of such 3-D objects, while the second section does not require such receptors. Various techniques of organizing the regular placement of such suitable 3-D objects onto the substrate are possible and arrangements providing for organizing such 3-D objects in two separate sections would provide an additional level of uniqueness.

The method of the present invention provides for manufacturing security tags or stamps that are optical scanner readable or x-ray readable and do not require a very large number of randomly chosen, information generating objects, such as 3-D balls made in two different colors (for example, a square array of 200×200=40,000 individual black and white objects), to prevent the practical duplication of the security tag of the present invention.

In an alternate embodiment of the present invention, suitable 3-D objects of different hardnesses comprising a mix of soft plastic and hard steel balls may be used to provide security tags of the present invention, wherein hard balls could be imprinted on or indented into certain parts or products where the presence of such tag is not desired, such as a jet engine compressor or turbine blades.

During the manufacturing process, information unique to the subject security tag being manufactured, such as the sequence of colored balls in the section of substrate with predetermined positioning of dimples or indentations and/or the sequence and colored balls in the other flat section of substrate tray without the dimples, is encoded and saved into a data base by scanning and measuring or by photography. The reflective and non-reflective nature of the black and white balls allows for optical scanning with a 2-D optical scanner, such as or similar to a bar code reader. Present commercially available 2-D bar code readers have a resolution of 600 dpi, which would allow a 200×200 array to be implemented into approximately a one inch square security tag using information generating objects, such as balls having a diameter of about 4 mils.

A reasonable, practical, not very large number of randomly positioned balls, ~40,000 in the example above, allows for an extremely large number of different security tags, $2^{40,000}$ or approximately $10^{13,300}$ Thus, even if a large part of the security tag of the present invention is extensively obstructed or destroyed, the remaining fragment will still be completely unique. For example, if 99% of the tag is destroyed, the remaining 1% will still have $10^{133}$ variants and will still uniquely identify each part, product or document. Using a suitable choice of material, such as glass balls, the security tag of the present invention may be made resistant to aging and chemical, electrical or radioactive exposure. The information in such security tag could provide for archival identification of the part, document or any item so tagged.

Security tags of the present invention can be made by suitably positioning or distributing a mixture of suitable, randomly mixed 3-D objects, such as balls, over a suitable base substrate. The high degree of random items makes it virtually impossible to copy the security code. Although counterfeiting of such tag is possible in principle, any attempt to do so would require the exact duplication of the specific random pattern by deliberate positioning or distribution of very large numbers of very small balls in exact positions. To do that (1) the counterfeiter must first have access to the exact part, document or pattern he plans to fake, (2) placement by hand is not feasible, (3) there exists no automated mechanism to do this, (4) tremendous effort would be required and, as a result, (5) such activity would not be profitable and would be extremely difficult, even in extreme situations such as national security situations. In addition, the second part of the security tag of the present invention having randomly distributed, possibly multicolored, balls on the flat part of the substrate makes duplication of the security tag impossible.

The information contained on the security tag of the present invention is random and unique to each tag. The information encoded into such security tag cannot be duplicated by any copying, printing, or photographic means. The information encoded in the security tag is machine or optically readable by a computer. The present invention provides a low cost, unique, passive, permanent, computer readable security tag that is not subject to copy or counterfeit. The security tags and methods of the present invention are suitable for application on documents such as passports, identification cards, currency, bank notes or other legal documents, manufactured parts and assemblies, such as critical military components, such as jet engine parts, that need audit trails or could be subject to counterfeiting, automobile VIN number equivalents or other similarly critical parts.

As an added, extra measure of security, the substrate layer, the compound layer, or the transparent layer can include a void pantograph, as is known in the art. The original stamp would not reveal the void pantograph, but if someone were to copy the stamp, the features are enhanced and would appear on the copied version, due to the finite resolution and digitization of the copier image. These features are enhanced and appear as an image, indicating to the user that he/she is looking at a copied version.

BRIEF DESCRIPTION OF THE DRAWINGS

The present invention is further described with reference to the accompanying drawings in which.

DETAILED DESCRIPTION OF THE ILLUSTRATED EMBODIMENTS

First Illustrated Embodiment of the First Section of the Security Tag

Figure 1:
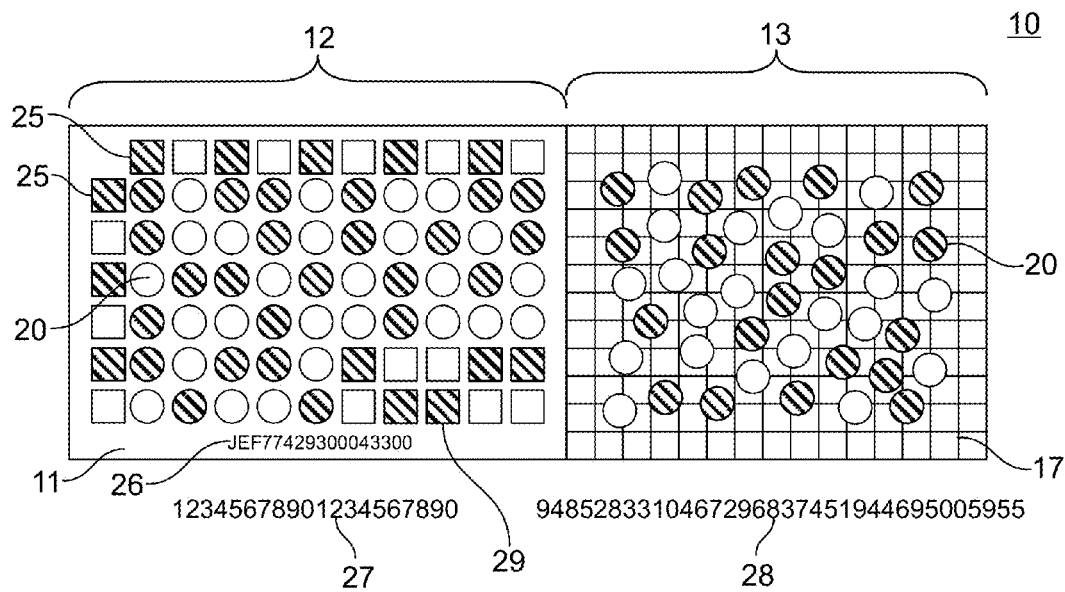
FIG. 1 is atop-down plan view of the embodiment of the security tag of the present invention.

Referring to FIG. 1, the security tag 10 comprises two major components—a suitable base substrate 11 and a substantial amount, preferably in the range of thousands or more, of objects 20 suitably supported and positioned on or in such substrate 11. Objects 20 are of at least two structural configurations, such as of at least two different colors, at least two different hardnesses or at least two different x-ray emission qualities. As shown in FIG. 1, substrate 11 is divided into a first section 12 shown on the left side and a second section 13 shown on the right side of FIG. 1. The first embodiment described herein refers to section 12 shown on the left side of FIG. 1.

Round objects 20, as described in detail below, are randomly distributed in section 12 of substrate 11 in a substantially predetermined regular geometrical pattern or patterns, such as straight horizontal rows and vertical columns, which may be parallel. The random distribution of objects 20 and the different distinguishing colors of the objects 20 create large amounts of encoding information. This feature or quality is unique to the present invention.

Figure 2:
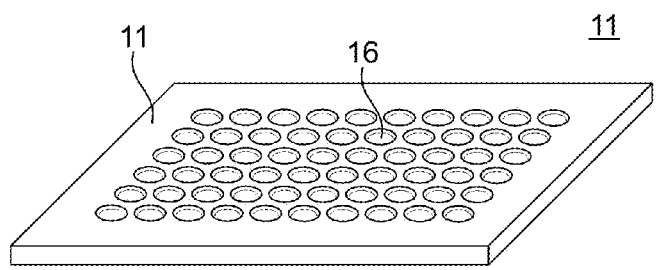
FIG. 2 is a perspective view showing a possible arrangement of dimples or indentations on the substrate of the embodiment of the security tag of the present invention shown in FIG. 1.

Substrate 11 may be any suitable substrate made of any suitable material in any suitable shape, size and/or thickness and any suitable method or means may be employed to achieve the desired positioning of objects 20 on section 12 of substrate 11. One such method for positioning objects 20 may be by positioning them directly on the flat surface of section 12 of substrate 11. Another method may be to position objects 20 in suitable dimples or indentations 16, shown in FIG. 2, on section 12 of substrate 11 in a substantially predetermined regular geometrical pattern. These indentations 16 may be round dimples of a suitable depth and may be formed at intersections of suitable groves made in the flat surface of substrate 11.

Objects 20 may be any suitable 3-D balls or 3-D but substantially flat disks suitably attached on flat surface or in indentations 16 of section 12 of substrate 11. Objects 20 may be made of glass, plastic or any other suitable material and may be a combination of two or more suitable colors in substantially similar numbers. 3-D objects 20 can be contained in a mix comprising the objects 20 and a liquid or gel. Random distribution of such multi-colored objects 20 on section 12 of substrate 11 within the predetermined regular pattern or patterns encodes for unique information specific to each security tag 10 of the present invention which is readily readable by any suitable scanning technique.

3-D objects 20 positioned on section 12 of tag 10 maybe made of just one suitable color while substrate 11 may be made of another suitable color, and the number of such objects 20 may be approximately equal to one-half of the number of objects 20 that would be required in a mix of two colors. The random distribution of such objects 20 of one color and empty indentations 16 on section 12 of substrate 11 made of another color may encode for said unique, readily readable information specific to each such security tag 10. 3-D objects 20 located on section 12 of substrate 11 may be securely attached to substrate 11 by adhesive or any other suitable means.

Substrate 11 can be made from a suitably delicate or weak material, to be damaged or destroyed during attempted tampering to reveal such tampering and provide evidence that such attempt was made. Once the damage is done, such attempted tampering cannot be hidden because security tag 10 of the present invention cannot be replaced with another tag having the same patterns, positioning and distribution of 3-D objects 20. This may be important in situations when security tag 10 is used as a seal protecting, rather than identifying, objects such as nuclear facilities, weapons depots, banks or secure rooms, secret documents or safes, or items used in transportation of goods such as containers, cartons or other packages.

Figure 3:
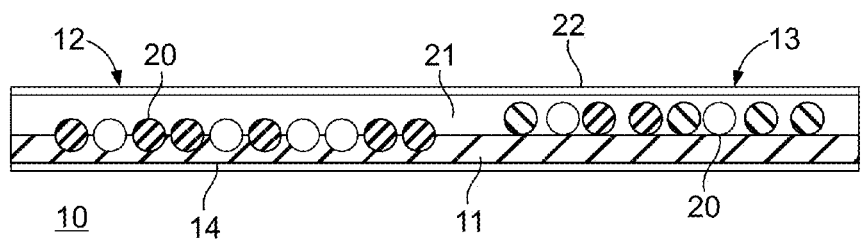
FIG. 3 is a side section view of the embodiment of the security tag of the present invention shown in FIG. 1.
Figure 4:
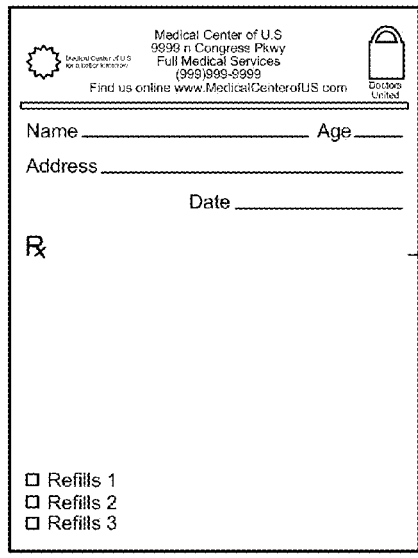
FIG. 4 is a top-down plan view of an original embodiment of the security tag of the present invention with a void pantograph.

Referring to FIG. 3, 3-D objects 20 located in indentations 16 on section 12 of substrate 11 may also be suitably encapsulated in a layer of suitable, preferably transparent compound 21, such as a layer of epoxy. Such encapsulation may be applicable regardless of whether objects 20 are distributed directly on flat surface of section 12 of substrate 11 or in indentations 16. For further protection of security tag 10 of the present invention, such suitable protective compound layer 21 may be covered by a suitable protective cover sheet layer 22. Substrate 11 of security tag 10 may also include a suitable adhesive layer 14 with a peel-off cover at the bottom to provide for attaching such security tag 10 to target objects. All layers of security tag 10 can be made of suitably transparent materials allowing such tag 10 to be made a part of some items, such as credit cards, which can be scanned through to provide for their identification.

Security tag 10 of the present invention may further comprise suitable reference markings 25, shown in FIG. 1, as may be necessary or convenient for providing guidance for reading the unique, readily readable information on security tag 10 by a suitable scanner. Reference markings 25 are represented in the form of black and white squares.

Security tag 10 also comprises a serial number 26, shown in FIG. 1, that may be suitably printed and positioned on protective compound layer 21 or suitable protective cover sheet layer 22. Security tag 10 of the present invention may further comprise an information number 27 to be generated from and comprising certain selected, preferably encoded and compressed, information about the unique, readily readable information present on section 12 of security tag 10. Information number 27 may be suitably printed and positioned on section 12 of security tag 10, on protective compound layer 21 or suitable protective cover sheet layer 22, or on the object to which said security tag 10 is attached. Serial number 26 and information numbers 27, shown in FIG. 1, are shown out of scale.

Section 12 of security tag 10 of the present invention may comprise additional special custom, non-random and unique to each tag, information printed onto protective compound layer 21 or suitable protective cover sheet layer 22. Information 29 is represented in FIG. 1 by ten black and white squares located, in two rows and five columns, in the right lower corner of section 12 of tag 10. Section 12 of security tag 10, where such information 29 is printed on, should preferably not contain objects 20 located below such information.

Information 29 may represent an encoded serial number, a name of a customer, error correction coding or any other desired information. This feature could be advantageous in applications such as identification documents, credit cards or passports, where the name of the holder could be encoded in part of the barcode and used to compare with the name of the owner of the item to which such security tag 10 is attached. This approach should allow another immediate and easy verification of authenticity of an item to which tag 10 is attached.

Second Illustrated Embodiment of the Second Section of the Security Tag

Referring again to FIGS. 1 and 3, a second embodiment of security tag 10 of the present invention comprises an additional plurality of 3-D objects 20 randomly distributed on the separate, substantially flat surface of second section 13 of substrate 11. Section 13 of substrate 11 is located on the right side of substrate 11 remote from section 12 as viewed in FIGS. 1 and 3. 3-D objects 20 positioned directly on a substantially flat section of substrate 11 are suitably encapsulated in layer 21 of a suitable, preferably transparent, compound. Random distribution of colors of such objects 20 on section 13 of substrate 11 provides for coding of additional unique, readily readable information on security tag 10.

3-D objects 20 distributed directly on a separate, substantially flat section 13 of substrate 11 may be of just one suitable color, while substrate 11 may be of another suitable color. Random distribution of any suitable number of such objects 20 of one color directly on substrate 11 made of another color may also encode for another unique, readily readable information specific to each such security tag 10. 3-D objects 20 may also be suitably encapsulated in a layer of any suitable, preferably transparent compound 21, shown in FIG. 3, such as a suitable layer of epoxy. For further protection of security tag 10, such suitable protective compound layer 21 may further be covered by a suitable protective cover sheet layer 22.

Section 13 of security tag 10, as described above, may further comprise a suitable grid 17, shown in FIG. 1, for assisting in reading information encoded in objects 20 randomly distributed on section 13 by a suitable scanner. Reference markings 25 similar to those used on section 12 of tag 10 can also be used on section 13 of security tag 10. Section 13 of security tag 10 of the present invention may further comprise suitable information 28 to be generated from and comprising certain selected, preferably encoded, information about the unique, readily readable information encoded on section 13. Information 28 may be suitably positioned on section 13 of security tag 10 or on the object to which such security tag 10 is attached. Information number 28 shown in FIG. 1 is shown out of scale.

Third Illustrated Embodiment of Objects 20 Made Partially of Hard Materials

Substrate 11 of security tag 10 and some 3-D objects 20 may also be made of suitably soft materials, such as soft plastics, while some other 3-D objects 20 may be made of suitably hard materials, such as hard steel. Industrial diamonds, hard industrial crystals or similar materials may be used in lieu of hard 3-D objects 20 made of metallic or similar materials. The mix of soft and hard 3-D objects 20 should be about 50-50. When such security tag 10 is being applied, hard 3-D objects 20 present therein can be indented, imprinted or embossed directly onto the surface of the product to be protected, while soft 3-D objects do not create indentations, by such security tag 10 using a suitable tool, such as an anvil or press. To avoid potential problems when indenting or imprinting security tag 10 as described, objects 20 should preferably be uniformly distributed on or in security tag 10. To avoid potential damage to or loss of information encoded in security tag 10, it may be preferable or required to use sudden, rapidly applied impact force to indent, imprint or emboss 3-D objects 20 of security tag 10 into a part to be so marked.

To also avoid potential damage to or loss of information encoded in security tag 10, the depths of indentations to be caused by hard 3-D objects 20 of security tag 10 being indented into the surface of an item or part to which such security tag 10 is being applied, need not be excessive.

When the depths of indentations applied to a part, in particular a metal part, protected by security tag 10 are substantially small or microscopic, a combination of suitable stain or paint or other suitable fill-up of such indentations may be used in conjunction with possible grinding, sanding, polishing or otherwise cleaning of the area of such part containing such indentations, and lighting by a suitable light, whether visible or invisible, may be used to obtain an accurate reading of information encoded therein by a suitable barcode scanner or other suitable scanning or photographic device.

The approach described herein is applicable to both the first and second sections 12 and 13, respectively, of security tag 10.

Other Aspects of the Illustrated Embodiments

It is understood herein that security tag 10 of the present invention is a part of a larger system comprising, in addition to security tag 10 with its sections 12 and 13 and other components, a suitable database 24 for storing serial number 26 and identification numbers 27 and 28 relating, in a unique way, to a particular security tag 10. It is also understood herein that serial number 26 and identification numbers 27 and 28 shall be easily accessible, via any suitable means, to users of such security tag 10.

Figure 5:
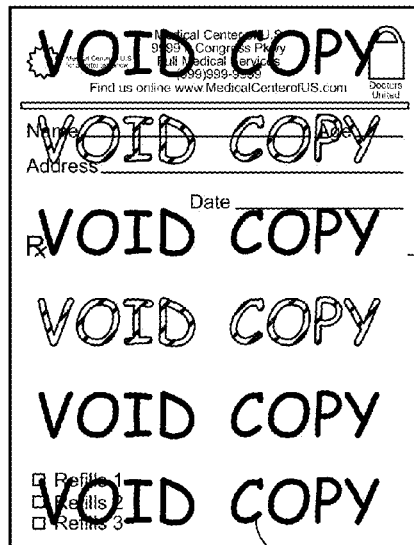
FIG. 5 is a top-down plan view of a copied embodiment of the security tag of the present invention with a void pantograph.

As an added, extra measure of security, the substrate layer 11, compound layer 21, or transparent cover sheet layer 22 can include a void pantograph 40, as is known in the art. The void pantograph can also be preprinted onto the plastic film that encapsulates the security tag 10. The original security tag 10 would not reveal the void pantograph 40, shown in FIG. 5. A void pantograph is a layout of lines, dots, and dashes printed on a document, such as the security tag 10, that is essentially invisible to the untrained, naked eye. When the security tag 10, containing a void pantograph, is scanned or copied the layout of lines, dots, and dashes will reveal a word, such as "void". When a copy is made the features are enhanced and the void pantograph 40 appears on the copied version, shown in FIG. 5, due to the finite resolution and digitization of the copier image. These features are enhanced and the void pantograph 40 appears as a visible image, indicating to the user that he/she is looking at a copied, non-authentic version. Careful choice of the pattern of the void pantograph 40 can also cause the copied barcode to stop functioning.

Figure 6:
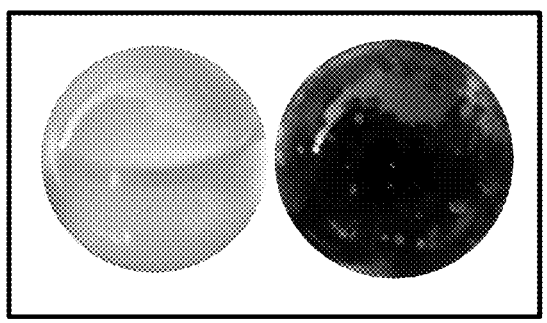
FIG. 6 is a top-down plan view of an embodiment of the balls of the security tag of the present invention under normal lighting on the left and the resulting copy under copier lighting on the right.
Figure 6:
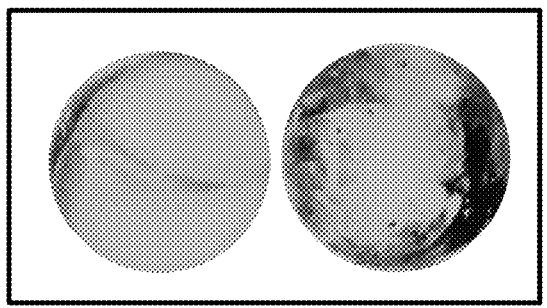
Figure 7:
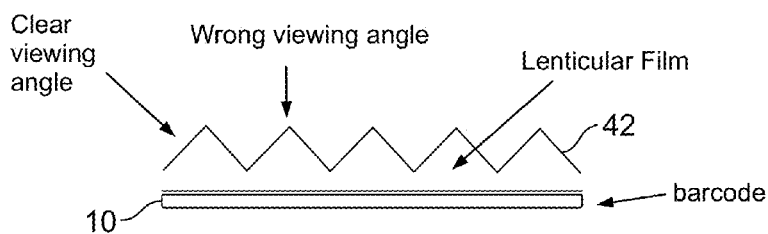
FIG. 7 is a cross-sectional view of an embodiment of the security tag of the present invention covered with lenticular film.
Figure 8:
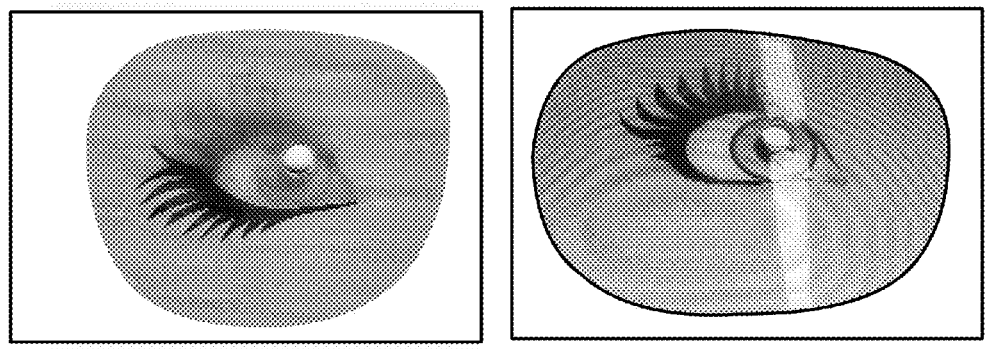
FIG. 8 is a top-plan view of an image of the embodiment of FIG. 7 copied at a 90 degree angle on the left and the image photographed from the correct angle on the right.
Figure 9:
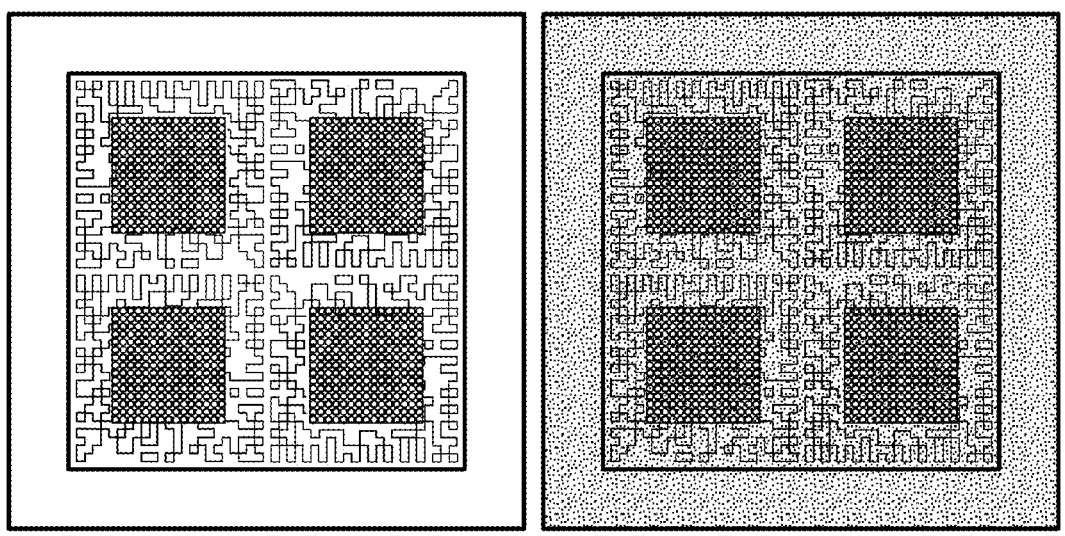
FIG. 9 is a top-plan view of an embodiment of the security tag of the present invention with specialty plastic cover film under room light on the left and under bright copier light on the right.

Several other methods can be employed to prevent copying with a copy machine. The security tag 10 may incorporate a mixture of black, white, and clear balls. The clear balls are retro-reflective such that copier copies will not properly copy the 1-0 binary pattern of the bar code. FIG. 6 shows the mixture of white and clear balls under normal lighting on the left and the resulting copy of the mixture of white and clear balls under bright, copier light on the right. The security tag 10, in an embodiment, may incorporate lenticular film 42. Images covered by lenticular film can only be clearly viewed on an angle, the clear viewing angle shown in FIG. 7. Viewing an image covered by lenticular film at a 90 degree angle, also shown in FIG. 7, shows a distorted image. Copying, or taking a head-on photograph, of a security tag 10 covered with lenticular film 42 at a 90 degree angle results in a blurred, fragmented, nonfunctional image. FIG. 8 shows a distorted image reproduced by a copier on the left and a photograph taken at the correct angle on the right. The security tag 10 of a further embodiment can also be covered with phosphorescent or fluorescent cover film. The bright light of a copy machine causes light emission of the phosphorescent or fluorescent cover film that obscures the security tag 10 barcode image. FIG. 9 shows the security tag 10 under room light on the left and a copy of the security tag 10, exposed to the bright light of a copier, on the right.

Figure 10:
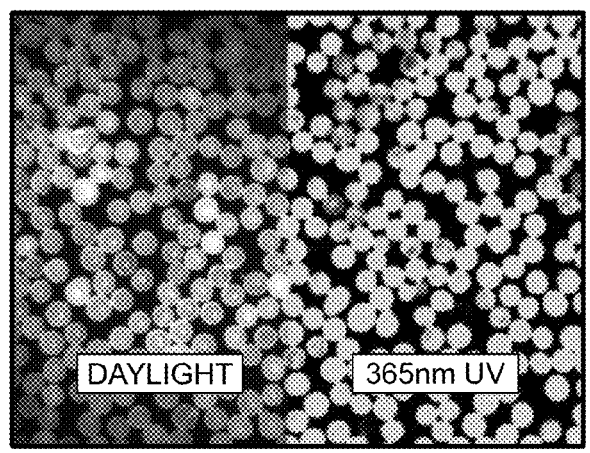
FIG. 10 is a top-plan view of an embodiment of the balls of the security tag of the present invention under daylight on the left and under ultraviolet light on the right.
Figure 11:
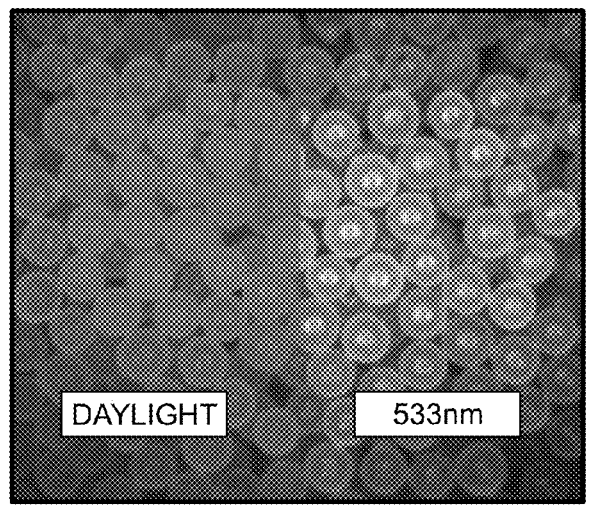
FIG. 11 is a top-plan view of an embodiment of the balls of the security tag of the present invention under daylight on the left and under green light on the right.
Figure 12:
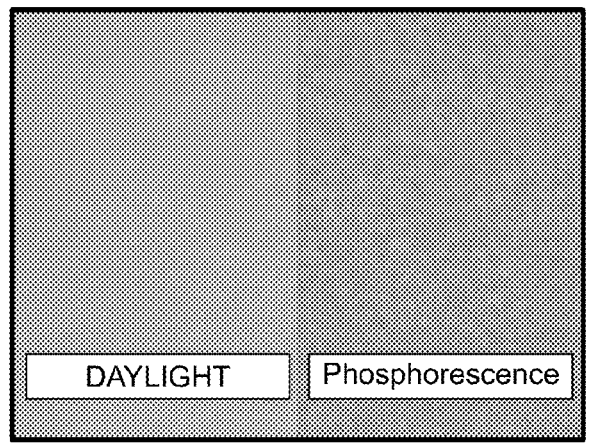
FIG. 12 is a top-plan view of an embodiment of the balls of the security tag of the present invention under daylight on the left and under phosphorescent light on the right.

There are several advantages to adding 3-D balls to the security tag 10. Because the 3-D balls are not printed, but manufactured and added, many additional properties can be incorporated. Microballs are readily available with a myriad of properties. For example, the microballs can simultaneously have different colors in room light, different fluorescent properties, phosphorescent properties, x-ray imaging density, radioactive properties, and magnetic properties. The same security tag 10 with these different properties can be made to appear differently under daylight or room light, ultraviolet light, or in the dark. FIG. 10 shows the color change of the balls when exposed to daylight on the left and exposed to ultraviolet (black light) light on the right. FIG. 11 shows the color change of the balls when exposed to daylight on the left and exposed to green light on the right. FIG. 12 shows the color change of the balls when exposed to daylight on the left and exposed to phosphorescence on the right.

Methods of the Present Invention

Methods of the present invention will now be described in some detail in relation to preferred embodiments of the apparatus described herein, sufficient for understanding the operation and advantages of such methods as used with such apparatus. While these methods are described in certain details, this description is not intended to limit the scope of the present invention. To the contrary, the present invention is intended to cover other additions, improvements, and modifications, all of which may be included within its scope, as defined by the claims attached hereto. Also, any specific attributes such as materials, colors, and so on as set forth herein, are for illustration only, they may be subject to change, and may be different in actual practice.

It shall be understood that while the methods of the present invention are described in relation to certain apparatus shown in the drawings attached hereto, the present invention is equally applicable to all other kinds of systems for recognizing counterfeit or fake parts based on the concept described herein.

Method 1

Method 1 for making security tag 10 of the present invention comprises the steps of:

Preparing a suitable base substrate 11 as a base for security tag 10 which comprises the first section 12;

Preparing a suitable mix of suitable 3-D objects 20;

Positioning such 3-D objects 20 on section 12 of base substrate 11 in substantially predetermined patterns wherein 3-D objects 20 are further randomly distributed within such predetermined pattern or patterns, thus encoding readily readable random information specific to such security tag; and Securing and/or protecting 3-D objects 20 to and on substrate 11.

Preparing a suitable mix of suitable 3-D objects includes preparing a mix made of 3-D objects of two colors, such as black and white, mixed in substantially similar numbers.

The predetermined pattern may be any suitable predetermined pattern, such as straight lines or rows, or any other suitable predetermined regular geometrical pattern suitable for scanning.

This method also comprises the steps of printing or securing suitable reference markings 25 in a suitable manner on security tag 10 to aid in scanning such tag 10 by a suitable scanner.

This method also comprises the steps of printing or securing a suitable serial number 26 on such security tag 10.

This method also comprises the steps of printing or securing a special custom, non-random and unique to each tag, information 29 onto protective compound layer 21 or suitable protective cover sheet layer 22.

Securing 3-D objects 20 positioned on section 12 of substrate 11 of security tag 10 comprises securing such 3-D objects 20 by a suitable adhesive, and further comprises the steps of encapsulating such 3-D objects 20 in a suitable encapsulating layer 21.

The present method also comprises the steps of covering such encapsulating layer 21 with a further suitable protective cover layer or sheet 22, and further comprises the steps of setting-up a suitable database 24 for storing any desired information about security tag 10.

The method also comprises the steps of reading into database 24 serial number 26 and all or part of readily readable random information specific to section 12 of security tag 10 and encoded in 3-D objects 20.

The method further comprises the step of calculating from data stored in database 24 suitable reference number 27 related to first section 12 of security tag 10, and storing such number 27 in such database 24 for further use, including for possible printing of number 27 on security tag 10 or on the item to which such security tag 10 is attached.

Method 2

Method 2 for making security tag 10 of the present invention comprises the steps:

Preparing a suitable substrate 11 as a base for security tag 10 which comprises second section 13, which is substantially flat without any dimples or indentations 16;

Preparing a suitable mix of suitable 3-D objects 20;

Distributing in a random manner such 3-D objects 20 on substantially flat section 13 of security tag 10, thus encoding readily readable random information specific to section 13 of security tag 10; and Securing and protecting 3-D objects 20 to and on substrate 11.

Preparing a suitable mix of 3-D objects includes preparing a mix made of 3-D objects of two colors, such as black and white, mixed in substantially similar numbers.

The step of printing or securing suitable reference markings 25 in a suitable manner on security tag 10 aids in scanning such reference tag 10 by a suitable scanner.

The method may also include the step of printing or securing a suitable serial number 26 on security tag 10.

Securing 3-D objects 20 on a substantially flat section 13 of substrate 11 of security tag 10 includes encapsulating such 3-D objects 20 in a suitable encapsulating layer 21.

The method also comprises the steps of covering such encapsulating layer 21 with a further suitable protective cover layer or sheet 22, and the steps of setting-up a suitable database 24 for storing any desired information relating to security tag 10.

The method also comprises the steps of reading into database 24 serial number 26 and all or part of readily readable random information specific to the section 13 of security tag 10 and encoded in 3-D objects 20.

The method further comprises the steps of calculating from data stored in database 24 suitable reference number 28 related to second section 13 of security tag 10 and storing such number 28 for further use, including for possible printing of such number 28 on security tag 10 or on the item to which such security tag 10 is attached.

Method 3

Method 3 for using security tag 10 of the present invention where such security tag 10 comprises the first section 12 only and comprises the following steps:

Steps on the manufacturer level—(a) scanning such security tag 10 with a suitable scanner and collecting its serial number 26 and random information present in suitable 3-D objects 20 positioned in section 12 of security tag 10, (b) converting such random information collected from 3-D objects 20 into suitable digital format such as suitable information numbers 27 and 28, (c) storing serial number 26, such random information and information numbers 27 and 28 (collectively the "data") in a suitable database 24 and (d) making information numbers 27 and 28 available for placing on security tag 10 or on an item to which security tag 10 is to be attached.

Steps at the user level—scanning security tag 10 with a suitable scanner and collecting serial number 26 and random information present in 3-D objects 20 positioned in first section 12 of security tag 10;

Converting random information collected from 3-D objects 20 into suitable digital format such as a suitable information numbers 27 and 28;

Comparing serial number 26 and suitable information numbers 27 and 28 collected at the user level with corresponding data for security tag 10 stored in suitable database 24 or recalculating serial number 26 and suitable information numbers 27 and 28; and If such comparison is successful, declaring security tag 10 as genuine.

Comparing such suitable information numbers 27 and 28 present on such security tag 10 or on such item to which security tag 10 is attached, with data stored in database 24 includes the step of comparing such information numbers 27 and 28 with corresponding information numbers 27 and 28 stored in database 24 or recalculating information numbers 27 and 28.

Comparing suitable information numbers 27 and 28 present on security tag 10, or on such item to which security tag 10 is attached, with data stored in database 24, includes comparing such information numbers 27 and 28 with corresponding random information stored in database 24.

Comparing random information made by and present in 3-D objects 20 positioned in section 12 of security tag 10 includes comparing all of such random information with all corresponding random information stored in database 24.

Method 4

Method 4 for using security tag 10 of the present invention where security tag 10 comprises both first section 12 and second section 13 comprises the following steps:

Steps on the manufacturer level—(a) scanning security tag 10 with a suitable scanner and collecting its serial number 26 and random information present in suitable 3-D objects 20 positioned in section 12 and randomly distributed in section 13 of security tag 10, (b) converting such information collected from 3-D objects 20 into suitable digital format such as suitable information numbers 27 and 28 separate for each sections 12 and 13, respectively,(c) storing serial number 26, random information and information numbers 27 and 28 (collectively the "data") in a suitable database 24 and (d) making information numbers 27 and 28 available for placing on security tag 10 or on an item to which security tag 10 is to be attached.

Steps at the user level—scanning security tag 10 with a suitable scanner and collecting serial number 26 and random information made by and present in 3-D objects 20 positioned in section 12 and randomly distributed in section 13 of security tag 10;

Converting such information collected from 3-D objects 20 into suitable digital format such as suitable information numbers 27 and 28 separately for section 12 and section 13, respectively, of security tag 10;

Comparing serial number 26 and information numbers 27 and 28 collected at user level with corresponding data for security tag 10 stored in database 24; and If such comparison is successful, declaring security tag 10 as genuine.

Comparing suitable information numbers 27 and 28, when present on security tag 10, or on such item to which security tag 10 is attached, with corresponding data stored in database 24 includes comparing such information numbers 27 and 28 with corresponding information numbers 27 and 28 stored in database 24.

Comparing suitable information numbers 27 and 28, when present on security tag 10, or on such item to which security tag 10 is attached, with corresponding data stored in database 24 includes comparing such information numbers 27 and 28 with corresponding random information stored in database 24.

Comparing such random information made by and present in 3-D objects 20 positioned in section 12 and randomly distributed in section 13 of security tag 10 includes comparing all of such random information scanned and collected at the user level with corresponding information stored in database 24.

The foregoing description of illustrated embodiments of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

What is claimed is:

1. An identification stamp providing authenticity verification information, comprising:
   a. a substrate layer;
   b. a plurality of individual and separable, identically-shaped 3-dimensional objects, each 3-dimensional object having one structural configuration different from the structural configuration of at least one other 3-dimensional object, such 3-dimensional objects randomly mixed and fastened to the substrate layer in a substantially predetermined geometrical pattern, the pattern of the random structural configurations in the geometrical pattern forming the verification information; and
   c. the substrate layer includes a void pantograph.

2. An identification stamp providing authenticity verification information, comprising:
   a. a substrate layer;
   b. a plurality of individual and separable, identically-shaped 3-dimensional objects, each 3-dimensional object having one structural configuration different from the structural configuration of at least one other 3-dimensional object, such 3-dimensional objects randomly mixed and fastened to the substrate layer in a substantially predetermined geometrical pattern, the pattern of the random structural configurations in the geometrical pattern forming the verification information, said 3-dimensional objects encapsulated in a compound layer on the substrate layer; and
   c. the compound layer includes a void pantograph.

3. An identification stamp providing authenticity verification information, comprising:

a. a substrate layer;

b. a plurality of individual and separable, identically-shaped 3-dimensional objects, each 3-dimensional object having one structural configuration different from the structural configuration of at least one other 3-dimensional object, such 3-dimensional objects randomly mixed and fastened to the substrate layer in a substantially predetermined geometrical pattern, the pattern of the random structural configurations in the geometrical pattern forming the verification information, said 3-dimensional objects encapsulated in a compound layer on the substrate layer; and c. a clear, transparent cover layer that covers the compound layer, said cover layer including a void pantograph.

4. A method for creating an identification stamp, the method comprising:

a. preparing a base substrate;

b. printing a void pantograph on said base substrate;

c. preparing a mix of individual and separable, identically-shaped 3-dimensional objects; and d. randomly positioning the mix on the base substrate in a predetermined geometrical pattern.

5. A method for creating an identification stamp, the method comprising:

a. preparing a base substrate;

b. preparing a mix of individual and separable, identically-shaped 3-dimensional objects;

c. randomly positioning the mix on the base substrate in a predetermined geometrical pattern;

d. encapsulating the mix in a compound layer; and e. printing a void pantograph on the compound layer.

6. A method for creating an identification stamp, the method comprising:

a. preparing a base substrate;

b. preparing a mix of individual and separable, identically-shaped 3-dimensional objects;

c. randomly positioning the mix on the base substrate in a predetermined geometrical pattern;

d. encapsulating the mix in a compound layer;

e. covering the compound layer with a clear, transparent cover layer; and f. printing a void pantograph on the cover layer.

7. An identification stamp providing authenticity verification information, comprising:

a. a substrate layer; and b. a plurality of 3-dimensional objects of at least two structural configurations which are randomly mixed and fastened to the substrate layer in a substantially predetermined geometrical pattern, the pattern of the random structural configurations in the geometrical pattern forming the verification information, said 3-dimensional objects including at least one clear retro-reflective 3-dimensional object.

8. An identification stamp providing authenticity verification information, comprising:

a. a substrate layer;

b. a plurality of 3-dimensional objects of at least two structural configurations which are randomly mixed and fastened to the substrate layer in a substantially predetermined geometrical pattern, the pattern of the random structural configurations in the geometrical pattern forming the verification information, said 3-dimensional objects encapsulated in a compound layer on the substrate layer;

c. a clear, transparent cover layer that covers the compound layer; and d. a film covering the clear, transparent cover layer.

9. The identification stamp of claim 8, wherein the film is one of a lenticular film, a phosphorescent film, and a fluorescent film.

10. An identification stamp providing authenticity verification information, comprising:

a. a substrate layer;

b. a plurality of 3-dimensional objects of at least two structural configurations which are randomly mixed and fastened to the substrate layer in a substantially predetermined geometrical pattern, the pattern of the random structural configurations in the geometrical pattern forming the verification information, said 3-dimensional objects encapsulated in a compound layer on the substrate layer; and c. a film covering the compound layer.

11. The identification stamp of claim 10, wherein the film is one of a lenticular film, a phosphorescent film, and a fluorescent film.

12. An identification stamp providing authenticity verification information, comprising:

a. a substrate layer;

b. a plurality of 3-dimensional objects of at least two structural configurations which are randomly mixed and fastened to the substrate layer in a substantially predetermined geometrical pattern, the pattern of the random structural configurations in the geometrical pattern forming the verification information, said 3-dimensional objects including at least one of different x-ray imaging density, different radioactivity, and different magnetic properties.

\* \* \* \* \*